United States Patent
Yanagida et al.

(10) Patent No.: US 9,789,564 B2
(45) Date of Patent: Oct. 17, 2017

(54) MANUFACTURING METHOD OF HEAT EXCHANGER, AND HEAT EXCHANGER MANUFACTURED BY SUCH MANUFACTURING METHOD

(71) Applicants: DENSO CORPORATION, Kariya-shi, Aichi-ken (JP); UACJ CORPORATION, Tokyo (JP)

(72) Inventors: Akira Yanagida, Kariya (JP); Shoei Teshima, Kariya (JP); Takeshi Iguchi, Kariya (JP); Masakazu Morimoto, Kariya (JP); Kotaro Kitawaki, Tokyo (JP); Kazuyoshi Nakashima, Tokyo (JP); Takashi Murase, Tokyo (JP)

(73) Assignees: UACJ CORPORATION, Tokyo (JP); DENSO CORPORATION, Aichi (JP)

( * ) Notice: Subject to any disclaimer, the term of this patent is extended or adjusted under 35 U.S.C. 154(b) by 544 days.

(21) Appl. No.: 13/715,545

(22) Filed: Dec. 14, 2012

(65) Prior Publication Data
US 2013/0199763 A1  Aug. 8, 2013

(30) Foreign Application Priority Data
Dec. 16, 2011 (JP) ................. 2011-275742

(51) Int. Cl.
| | |
|---|---|
| *B23K 20/00* | (2006.01) |
| *B23K 35/28* | (2006.01) |
| *F28F 21/08* | (2006.01) |
| *B23K 35/36* | (2006.01) |
| *B23K 35/38* | (2006.01) |
| *B23K 35/02* | (2006.01) |
| *B23K 101/14* | (2006.01) |
| *B23K 103/10* | (2006.01) |
| *B23K 103/12* | (2006.01) |
| *B23K 103/18* | (2006.01) |

(52) U.S. Cl.
CPC ........ *B23K 20/002* (2013.01); *B23K 35/0222* (2013.01); *B23K 35/0233* (2013.01); *B23K 35/0244* (2013.01); *B23K 35/286* (2013.01); *B23K 35/3603* (2013.01); *B23K 35/3605* (2013.01); *B23K 35/383* (2013.01); *F28F 21/084* (2013.01); *F28F 21/085* (2013.01); *B23K 2201/14* (2013.01); *B23K 2203/10* (2013.01); *B23K 2203/12* (2013.01); *B23K 2203/18* (2013.01); *F28F 2275/04* (2013.01)

(58) Field of Classification Search
CPC .............. B23K 20/002; B23K 35/3603; B23K 35/0233; B23K 35/3605; B23K 35/383; B23K 35/0244; B23K 35/0222; B23K 35/286; B23K 2203/10; B23K 2203/08; B23K 2203/12; B23K 2201/14; F28F 21/084; F28F 21/085; F28F 2275/04; B23P 15/26; Y10T 29/4935; Y10T 29/49361

USPC ....... 29/890.03; 165/177; 228/183, 244–262, 228/262.51, 262.61, 262.9
See application file for complete search history.

(56) References Cited

U.S. PATENT DOCUMENTS

| | | | | |
|---|---|---|---|---|
| 3,105,293 A | * | 10/1963 | Skinner ................... | B23K 1/19 228/132 |
| 4,089,453 A | * | 5/1978 | Jenkins ................... | B23K 1/19 228/154 |
| 4,224,499 A | * | 9/1980 | Jones ...................... | B23K 28/02 219/118 |
| 4,693,501 A | * | 9/1987 | Logsdon, Jr. ........ | B23K 1/0012 285/139.1 |
| 5,316,206 A | * | 5/1994 | Syslak et al. ................ | 228/183 |
| 5,322,205 A | * | 6/1994 | Kato ........................ | B23K 1/06 228/110.1 |
| 5,407,124 A | * | 4/1995 | Bose ........................ | 228/262.51 |
| 5,549,335 A | * | 8/1996 | Wohrstein ............ | F16L 13/0209 228/198 |
| 6,149,049 A | * | 11/2000 | Loftfield ............... | B23K 1/0012 219/78.15 |
| 6,164,517 A | | 12/2000 | Kim et al. | |
| 6,840,435 B2 | * | 1/2005 | Ohara et al. ............. | 228/262.51 |
| 8,152,047 B2 | * | 4/2012 | Rottmann ............ | B23K 1/0012 165/178 |

(Continued)

FOREIGN PATENT DOCUMENTS

| | | |
|---|---|---|
| JP | 10-052753 A | 2/1998 |
| JP | 2000117484 | 4/2000 |

(Continued)

OTHER PUBLICATIONS

Title: Brazing Aluminum and Copper; Date: Mar. 19, 2010; Publisher: Welcome to Brazing Blog; and pp. 1-10.*
Jacobson, David M. Humpston, Giles. (2005). Principles of Brazing. ASM International. Online version available at: http://app.knovel.com/hotlink/toc/id:kpPB000004/principles-brazing/principles-brazing.*
Office Action dated Oct. 11, 2013, issued in counterpart Japanese Patent Application No. 2011-275742. (2 pages).

*Primary Examiner* — Jason L Vaughan
(74) *Attorney, Agent, or Firm* — Westerman, Hattori, Daniels & Adrian, LLP

(57) ABSTRACT

The disclosed method relates to manufacturing a heat exchanger which causes no brazing defects, and a heat exchanger manufactured by the method. The method relates to manufacturing a heat exchanger having an aluminum alloy tube defining a cooling-medium flowing passage and a copper alloy tube defining a water flowing passage, wherein a heat exchange is carried out between a cooling medium flowing through the cooling-medium flowing passage and water flowing through the water flowing passage. The aluminum alloy tube and the copper alloy tube are brazed to each other at a temperature of less than 548° C.

10 Claims, 2 Drawing Sheets

(56) References Cited

U.S. PATENT DOCUMENTS

| | | | | |
|---|---|---|---|---|
| 8,475,954 B2* | 7/2013 | Ijaz | ................ | H01M 2/105 429/151 |
| 2005/0155750 A1* | 7/2005 | Mitchell | ................ | F28F 1/32 165/182 |
| 2009/0078682 A1* | 3/2009 | Feng | ................ | B23K 11/0935 219/61.1 |
| 2009/0212025 A1* | 8/2009 | Zuo | ................ | B23K 11/002 219/61.7 |
| 2010/0224351 A1* | 9/2010 | Sasaoka | ................ | B23K 1/0012 165/180 |
| 2013/0319569 A1* | 12/2013 | Kikuno | ................ | B23K 1/0012 138/109 |

FOREIGN PATENT DOCUMENTS

| | | |
|---|---|---|
| JP | 2001-334387 A | 12/2001 |
| JP | 2002107069 | 4/2002 |
| JP | 2006341304 | 12/2006 |
| JP | 2007-181857 A | 7/2007 |
| JP | 2009-148772 A | 7/2009 |
| JP | 2009-172615 A | 8/2009 |
| JP | 2010255869 | 11/2010 |
| JP | 2011-33290 A | 2/2011 |

\* cited by examiner

EROSION

MANUFACTURING METHOD OF HEAT EXCHANGER, AND HEAT EXCHANGER MANUFACTURED BY SUCH MANUFACTURING METHOD

BACKGROUND

The disclosed method relates to a method of manufacturing a heat exchanger and so forth, used in a heat pump type hot-water supply system, in which a cooling medium is may function as a heat source, and to a heat exchanger manufactured by such a manufacturing method.

BACKGROUND ART

In a heat pump type hot-water supply system in which a $CO_2$ cooling medium subjected to a high temperature and a high pressure is employed as a heat source, heat exchange is carried out between the cooling medium and the water to thereby heat the water, and the hot-water supply system has widely prevailed in recent years. In a heat exchanger used in this known hot-water supply system, in general, a copper alloy tube of heat conductivity and high corrosion resistance is utilized as one of the composition elements. However, for the purpose of improvement in transportability and cost reduction, it has been proposed that an aluminum alloy tube featuring high heat conductivity, lightness and low cost is utilized for a cooling medium passage.

In a conventional heat exchanger in which copper alloy tubes are utilized for a cooling medium flow-passage and a water flow-passage, respectively, since a joining is made between the copper alloy tubes, a variety of joining methods such as a furnace brazing method, a soldering method and so forth has been put into practice. Nevertheless, it is known that a joining between an aluminum alloy and a copper alloy is very difficult due to the fact that there are many problems such as a difference in temperature of approximately 400° C. between respective melting points of the aluminum alloy and the copper alloy; that a firm oxide film exists on a surface of the aluminum alloy; and so on.

JP 2002-107069 A discloses a heat exchanger in which an aluminum alloy cooling-medium tube and a copper alloy water tube are utilized. In this heat exchanger, the aluminum alloy cooling-medium tube and the copper alloy water tube are mechanically joined to each other. Also, in a heat exchanger disclosed in JP 2010-255869 A, an aluminum alloy cooling-medium tube and a copper alloy water tube are joined to each other by using a brazing material.

JP 2000-117484 A discloses a method of brazing an aluminum alloy and a copper alloy to each other by using a brazing material. In this method, it is used for such a brazing material, an Al—Si—Cu-based alloy which features a total contents of an Si element and/or a Cu element falling within a range from 5 mass % to 15 mass %, or an Al-based brazing material which contains Al, Si of 10 mass %, Cu of 4 mass %, Zn of 10 mass %, and a brazing process is carried out at a temperature of approximately 600° C. Also, JP 2006-341304 A discloses a method of brazing an aluminum alloy and a copper alloy to each other by using a Zn—Al-based brazing material.

In the heat exchanger of JP 2002-107069 A, the aluminum alloy cooling-medium tube and the copper alloy water tube are mechanically joined to each other. In this case, due to the fact that the respective rates of thermal expansion in both the alloys are different from each other, when a temperature difference between the flowing water and the cooling medium becomes larger, a thermal stress is generated at the joined region of both the alloys. Thus, a deformation occurs in the joined region of both alloys, so that a uniform join state (i.e., a close contact state) cannot be maintained in the joined region of both the alloys, resulting in deterioration in heat exchanging effectiveness.

In the heat exchanger of JP 2010-255869 A, it is not concretely taught what components the brazing material are composed of, and thus an erosion may occur depending on a type of the used brazing material. In this case, as shown in FIG. 1, the erosion is defined as a phenomenon in which a member to be joined is eroded by a melted brazing material. In FIG. 1, reference "2" indicates the aluminum alloy cooling-medium tube; reference "3" indicates a copper alloy water tube; reference "4" indicates a brazing material; and a portion 1 encircled by a solid ellipse represents an erosion-occurring region.

In a case where a brazing process is carried out by using the brazing method disclosed in JP 2000-117484 A, due to the fact that a brazing temperature is more than a eutectic temperature (548° C.) of both the aluminum alloy and the copper alloy, a eutectic-melting occurs and there is a possibility that members to be joined to each other would be subjected to a deformation. In this case, the eutectic-melting is defined as a phenomenon in which a join junction between the aluminum alloy material and the copper alloy material is locally melted, and FIG. 2 is a view showing that the eutectic-melting progresses so that the joined members may be subjected to a large deformation. In FIG. 2, reference "5" indicates an aluminum alloy plate; reference "6" indicates a copper alloy tube; and reference "7" indicates a brazing material. After the brazing process, configurations of both the aluminum alloy plate and the copper alloy tube were subjected to a remarkable deformation due to the melting.

In the method of brazing the aluminum alloy and the copper alloy to each other by using the Zn—Al-based brazing material, as disclosed in JP 2006-341304 A, since the Zn—Al-based brazing material is insufficient in corrosion resistance, it is difficult to apply the brazing method to a heat exchanger which is possibly exposed to a severe corrosive environment.

SUMMARY

The invention relates to a method of manufacturing a heat exchanger having an aluminum alloy tube defining a cooling-medium flowing passage and a copper alloy tube defining a water flowing passage, wherein a heat exchange is carried out between a cooling medium flowing through the cooling-medium flowing passage and water flowing through the water flowing passage, and wherein said aluminum alloy tube and said copper alloy tube are brazed to each other at a temperature of less than 548° C. The brazing is carried out by using a brazing material which is composed of Al—Cu—Si based alloy or an Al—Cu—Si—Zn based alloy. The Al—Cu—Si based alloy or the Al—Cu—Si—Zn based alloy contain at least one of Cu in an amount of up to 27 mass % and Si in an amount of up to 5.5 mass %. A ratio of liquid phase mass created in the brazing material produced from the Al—Cu—Si based alloy or the Al—Cu—Si—Zn based alloy-to a total mass of the brazing material is at least 60% at the temperature of 548° C. The invention also relates to a heat exchanger made by the method.

Problems to be Resolved

The disclosed method may be applied such as to a heat exchanger used in a heat pump type hot-water supply system, in which a cooling medium is employed as a heat source. In particular since an aluminum alloy tube having cooling-medium flowing passages and a copper alloy tube having water flowing passages are brazed to each other at a temperature which is lower than a eutectic temperature (548° C.) of both the aluminum alloy and the copper alloy, it is possible to provide not only a method of manufacturing a heat exchanger but also a heat exchanger manufactured by such a method which causes little or no brazing defects such as a eutectic melting, an erosion and so forth.

In a first aspect, the present invention-relates to a method of manufacturing a heat exchanger having an aluminum alloy tube that has a cooling-medium flow passage and a copper alloy tube that has a water flow passage, wherein heat exchange is carried out between a cooling medium flowing through the cooling-medium flow passage and water flowing through the water flow passage, where the aluminum alloy tube and the copper alloy tube are brazed to each other at a temperature of less than 548° C. The aluminum alloy may include a pure aluminum material, and the copper alloy may include a pure copper material.

In a second aspect, the present invention relates to a manufacturing method, wherein brazing is carried out by using a brazing material which is composed of an Al—Cu—Si based alloy or an Al—Cu—Si—Zn based alloy.

In a third aspect, the present invention relates to a manufacturing method, wherein the brazing material which is composed of either the Al—Cu—Si based alloy or the Al—Cu—Si—Zn based alloy contains at least one of: Cu in an amount of up to 27 mass % and Si in an amount of up to 5.5 mass %.

In a fourth aspect, the present invention relates to a manufacturing method, wherein a liquid phase ratio, which is defined as the ratio of liquid phase mass created in the brazing material that is either the Al—Cu—Si based alloy or the Al—Cu—Si—Zn based alloy, to the total mass of the brazing material, is at least 60% at 548° C.

In a fifth aspect, the present invention relates to a heat exchanger manufactured by any one of the methods as set forth above.

Effects of the Invention

In a heat exchanger manufacturing method according to the present invention, and a heat exchanger manufactured by the method, since an aluminum alloy tube having cooling-medium flow passages and a copper alloy tube having water flow passages can be brazed to each other without any brazing defects, it is possible to provide a heat exchanger featuring a superior heat exchanging efficiency.

BRIEF EXPLANATIONS OF DRAWINGS

EMBODIMENT FOR CARRYING OUT THE INVENTION

Figure 1:
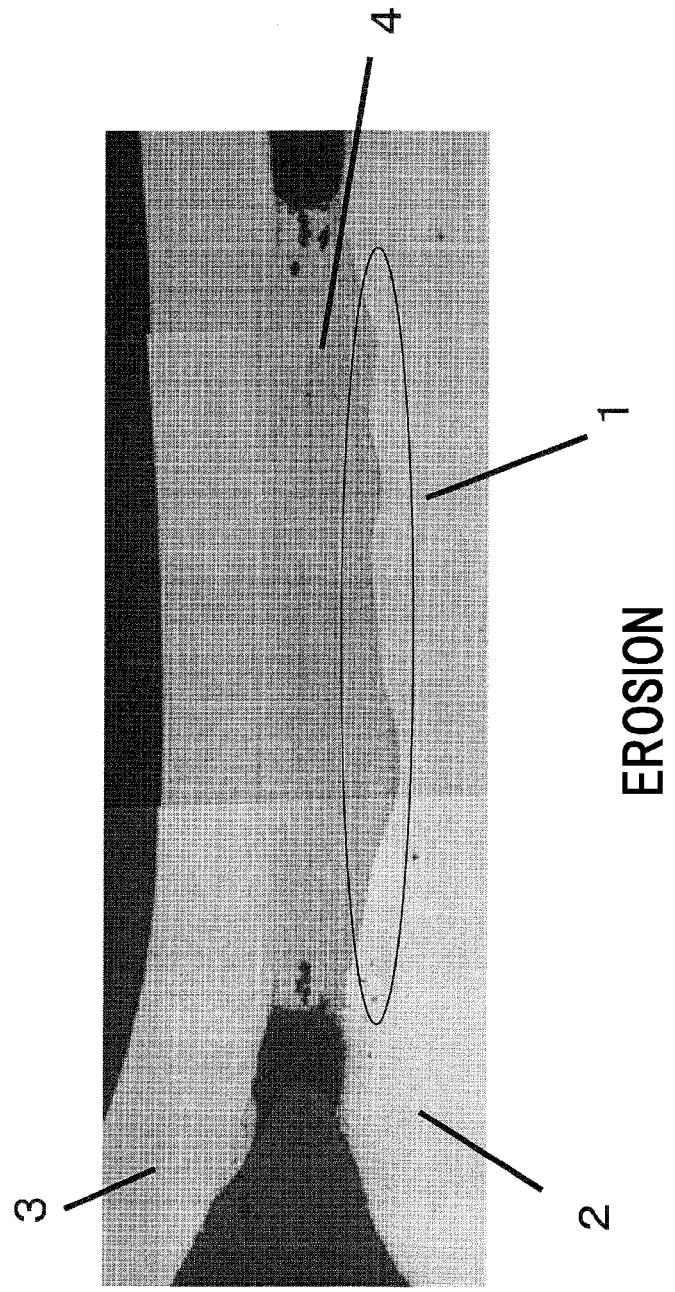
FIG. 1 (Prior art) is a microscope photograph showing an erosion which occurred when an aluminum alloy material and a copper alloy material were brazed to each other.
Figure 2:
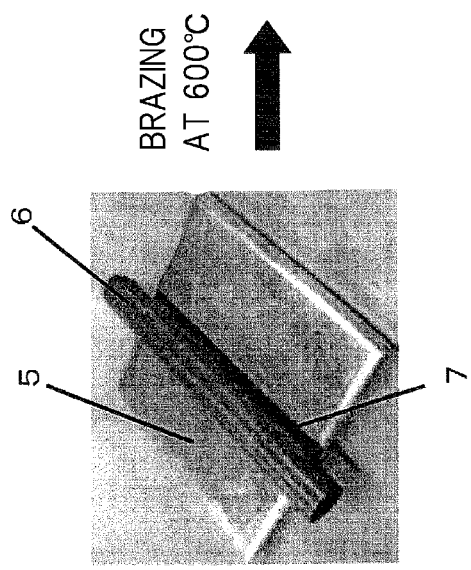
FIG. 2 (Prior art) is a photograph showing a eutectic-melting which occurred when an aluminum alloy material and a copper alloy material were brazed to each other.

The present invention is explained in detail below.
(1) Brazing Temperature:
The brazing temperature, at which an aluminum alloy cooling-medium tube and a copper alloy water tube are brazed to each other, is less than 548° C. This is because a eutectic-melting occurs in the aluminum alloy and the copper alloy at the temperature which is equal to or more than 548° C., so that a member(s) to be joined (i.e., the aluminum alloy cooling-medium tube and/or the copper alloy water tube) is subjected to a deformation and/or a decline in strength. In order that a brazing material can be sufficiently melted, a lower limit of the brazing temperature is preferably equal to or more than 510° C. Thus, preferably, the brazing temperature is within a range from at least 510° C. to less than 548° C.

(2) Composition of Brazing Material:
In the present invention, for the brazing material, it is possible to use either Al—Cu—Si based alloy or Al—Cu—Si—Zn based alloy. When either the Al—Cu—Si based alloy or the Al—Cu—Si—Zn based alloy is used, a liquidus curve temperature can be lowered to less than the eutectic temperature (548° C.) of both the aluminum alloy and the copper alloy, and thus the brazing process can be carried out at a temperature below the eutectic temperature. Accordingly, it is possible to carry out the brazing process, in which the deformation and the strength decline of the member(s) to be joined can be suppressed, without occurrence of eutectic-melting in both the aluminum alloy and the copper alloy.

It is preferable that the Al—Cu—Si based alloy or the Al—Cu—Si—Zn based alloy which is used in the present invention contains at least one of: Cu in an amount of up to 27 mass % (referred to as "%" hereinafter) and Si of in an amount of up to 5.5%. Cu and Si are added to each of the alloys enhance liquidity of the brazing material. The addition of Cu and Si serves to lower the liquidus curve temperature of the brazing material. When the content of Cu is more than 27%, and/or when the content of Si is more than 5.5%, the enhancement of the liquidity of the brazing material is too much so that an erosion may occur in the brazing material. When erosion occurs in the brazing material, a strength, corrosion resistance and brazing ability decline, resulting in deterioration in performance of a heat exchanger. Although an alloy containing either Cu or Si of 0% is included in neither the Al—Cu—Si based alloy nor the Al—Cu—Si—Zn based alloy, such an alloy may be used for the brazing material.

In the brazing material that includes Al—Cu—Si—Zn based alloy, the addition of Zn lowers the liquidus curve temperature of the brazing material. Also, the addition of Zn serves to give a lower potential to the brazing material, and thus it is possible to regulate a potential of the brazing material so that an erosion resistance in a heat exchanger can be improved. Nevertheless, when the content of Zn is too much, an erosion resistance of the brazing material conspicuously declines, so that the content of Zn is preferably present in an amount of up to 20%.

Note, concerning the inevitable impurities which are necessarily contained in a raw material for producing the brazing material, when Fe impurity is 0.3% or less, when the remaining impurities are 0.05% or less, and when a total percentage of the impurities is 0.15% or less, it is possible to obtain a heat exchanger according to the present invention without impairing its characteristic.

When the brazing material produced from either the Al—Cu—Si based alloy or the Al—Cu—Si—Zn based alloy has a liquid phase ratio of less than 60% at 548° C., and when a brazing process is carried out at less than 548° C., an amount of liquid phase which is necessary for the brazing process is small so that there may be a case where a brazing junction cannot sufficiently form. Thus, preferably, the brazing material should have a liquid phase ratio of at least 60% at 548° C. Herein, the liquid phase ratio is defined as the ratio of a liquid phase mass, which is created in the brazing material produced from either the Al—Cu—Si based alloy or the Al—Cu—Si—Zn based alloy, to the total mass of the brazing material concerned.

It is very difficult to measure a real liquid-phase ratio during a heating process. Thus, the liquid-phase ratio is calculated by using an equilibrium calculation. The liquid-phase ratio is calculated by using thermodynamic equilibrium calculation program software such as "Thermo-Calc Software made by AB Corporation" or the like, on the basis of a composition of the alloy brazing material and a heating temperature thereof.

(3) Form or Shape of Brazing Material:

In general, it is possible to provide the brazing material in a powder form, a rod-like form, a foil form or a cladded form (i.e., a cladded material) in which a brazing material is previously cladded on a member to be joined. When a brazing process is carried out by using an aluminum alloy brazing material according to the present invention, it is preferable to use the brazing material in either the powder form or the foil form.

a) Powder-Form Brazing Material:

Powder form brazing material preferably has an average grain diameter falling within a range from 10 μm to 150 μm. When the average grain diameter is less than 10 μm, it is impossible to completely remove oxide films from the powder brazing material during a brazing process, and thus there is a case where a defect easily may occur at a brazed junction. Also, when the average grain diameter is more than 150 μm, there may be a case where it is difficult to coat a surface of an aluminum alloy tube with the powder brazing material in a suitable amount, and thus the brazing material is ununiform in an amount over a brazed region, so that a defect such as an erosion may be caused.

b) Foil-Form Brazing Material:

Preferably, a foil-form brazing material has a thickness falling within a range from 0.1 mm to 0.2 mm. When the foil-form brazing material has a thickness of less than 0.1 mm, there may be a case where the foil-form brazing material having such a thickness is not suitable for a mass production because a production thereof is too costly. Also, when the foil-form brazing material has a thickness of more than 0.2 mm, an absolute amount of the brazing material becomes large, so that a defect such as an erosion may be caused.

(4) Flux:

a) Kind of Flux:

In general, when a brazing process is carried out, a flux is used to remove oxide films which cover surfaces of both a brazing material and a member to be joined. As such a flux, it is possible to utilize a fluoride-based flux, a chloride-based flux or a mixture composed of the fluoride-based flux and the chloride-based flux, which are used when a brazing process for a usual aluminum alloy is carried out. For a representative of the fluoride-based flux, there are $KAlF_4$, $K_2AlF_5$, $K_2AlF_5.H_2O$, $K_3AlF_6$, $AlF_3$, $KZnF_3$, $K_2SiF_6$, $Cs_3AlF_6$, $CsAlF_4.2H_2O$, $Cs_2AlF_5.H_2O$ and so forth, and one of these fluxes may be solely used, or a mixture composed of more than one of these fluxes may be used. Also, for a representative of the chloride-based flux, there are NaCl, KCl, LiCl, $ZnCL_2$ and so forth, and one of these fluxes may be solely used, or a mixture composed of more than one of these fluxes may be used.

Due to the fact that removal of an oxide film must be carried out before a brazing material is melted, the melting point of a flux that is selected lower than that of the brazing material. It is preferable to use a flux featuring a low melting point, such as the fluoride-based flux including CsF, and the chloride-based flux including $ZnCl_2$. Note, in either the fluoride-based flux or the chloride-based flux, it is effective to set the melting point to be at least 400° C., preferably, at least 450° C.

b) Coating of Flux:

In general, a flux is prepared as a slurry-like suspension in which a flux component is suspended in a dispersion medium composed of a volatile liquid such as an alcohol, a pure water or the like, a binder and so forth, and a foil-form brazing material or a member to be joined is coated with the flux.

When the powder-form brazing material is used, it is preferable that the member to be joined is coated with a slurry-like suspension in which the flux component is suspended together with the powder-form brazing material in the aforesaid dispersion medium, so that the coat of both the powder-form brazing material and the flux can be uniformly applied to the member to be joined. Although a mixing ratio of the powder-form brazing material and the flux may be changed in accordance with a composition and a configuration of the member to be joined as well as another member to be joined to the former member to be joined, it is preferable to set the mixing ratio as a ratio of 10-150 weight parts of the flux to 100 weight parts of the powder-form brazing material.

When the member to be joined is coated with either the slurry in which the flux component is suspended or the slurry in which both the flux component and the powder-form brazing material are suspended, a coating method is not subjected to any limitation as long as the uniform application of the coat of the slurry to the member to be joined is ensured. It is possible to utilize not only a brush coating method or a roll coating method but also an immersion coating method or a spray coating method.

(5) Pre-Assembly of Aluminum Alloy Cooling-Medium Tube, Copper Alloy Water Tube And Brazing Material:

Although a method of pre-assembling the aluminum alloy cooling-medium tube, the copper alloy water tube, and the brazing material to be put therebetween is not subjected to limitation, when the powder-form brazing material is used, a coat of the slurry containing both the powder-form brazing material and the flux is applied to a member to be joined, before or after the aluminum alloy cooling-medium tube and the copper alloy water tube are pre-assembled into each other. When the foil-form brazing material is used, a coat of the slurry containing the flux component may be applied to a member to be joined, before or after the aluminum alloy cooling-medium tube, the copper alloy water tube and the foil-form brazing material are pre-assembled so that the foil-form brazing material is put therebetween. Alternatively, after a coat of the slurry containing the flux is applied to the foil-form brazing material by using the roll coating method, or after the applied coat of the slurry is dried, the aluminum alloy cooling-medium tube, the copper alloy water tube and the foil-form brazing material are pre-assembled so that the foil-form brazing material is put between the aluminum alloy cooling-medium tube and the copper alloy water tube.

(6) Atmosphere in Brazing Process:

After the aluminum alloy cooling-medium tube, the copper alloy water tube, and the brazing material to be put therebetween are combined with each other, the combined regions therebetween are heated and brazed to each other. Since the brazing material composed of the aluminum alloy and the aluminum alloy cooling-medium tube are susceptible to oxidization, it is preferable to carry out the heating/brazing process in a non-oxidization atmosphere including an inert gas such as nitrogen gas, an argon gas or the like or a reducing gas such as a hydrogen gas or the like. Since the powder-form brazing material is further susceptible to oxidization, preferably, a vacuum is created in the brazing environment, and then the vacuum is filled with either inert gas or the reducing gas.

EXAMPLES

Next, the present invention is further explained with reference to the Examples.

Examples 1 to 64 and Comparative Examples 65 to 69

(1) Preparation of Powder-Form Brazing Material:

Plural kinds of brazing materials in a powder form were used. In order to obtain the plural kinds of powder-form brazing materials, plural kinds of molten metals for aluminum alloys, which were composed of respective compositions shown in TABLES 1, 2 and 3, the balances of Al, and inevitable impurities, and which had a temperature of 750° C., were sprayed in an argon gas, and were rapidly cooled to thereby produce plural kinds of aluminum alloy powders. These kinds of aluminum alloy powders had respective average grain diameters shown in TABLES 1, 2 and 3.

TABLE 1

| | | Component Composition of Brazing Material | | | | | | | | |
|---|---|---|---|---|---|---|---|---|---|---|
| | Alloy Numbers | Cu (mass %) | Si (mass %) | Zn (mass %) | Al + Inevitable Impurities | Liquid Phase Ratio at 548° C. (%) | Brazing Temperature (° C.) | Average Grain Diameter of Powder (μm) | Flux | Brazing Atmosphere |
| Examples | 1 | 25.0 | 5.0 | 0 | Balance | 100 | 547 | 27 | Fluoride-Based | Nitrogen |
| | 2 | 17.5 | 7.0 | 0 | Balance | 95 | 540 | 10 | Chloride-Based | Nitrogen |
| | 3 | 20.0 | 5.0 | 0 | Balance | 88 | 542 | 150 | Fluoride-Based | Nitrogen |
| | 4 | 27.0 | 5.5 | 0 | Balance | 100 | 542 | 53 | Chloride-Based | Nitrogen |
| | 5 | 27.0 | 8.0 | 0 | Balance | 98 | 538 | 47 | Mixture-Based | Nitrogen |
| | 6 | 27.0 | 11.0 | 0 | Balance | 94 | 526 | 121 | Fluoride-Based | Argon |
| | 7 | 15.0 | 11.0 | 0 | Balance | 85 | 534 | 140 | Chloride-Based | Hydrogen |
| | 8 | 32.5 | 5.5 | 0 | Balance | 99 | 531 | 30 | Chloride-Based | Nitrogen |
| | 9 | 40.0 | 5.5 | 0 | Balance | 65 | 547 | 67 | Fluoride-Based | Nitrogen |
| | 10 | 40.0 | 1.0 | 0 | Balance | 67 | 546 | 90 | Mixture-Based | Nitrogen |
| | 11 | 12.5 | 4.9 | 0 | Balance | 60 | 547 | 84 | Mixture-Based | Nitrogen |
| | 12 | 20.0 | 2.0 | 0 | Balance | 63 | 546 | 130 | Fluoride-Based | Nitrogen |
| | 13 | 22.5 | 2.0 | 0 | Balance | 72 | 542 | 77 | Mixture-Based | Nitrogen |
| | 14 | 25.0 | 1.0 | 0 | Balance | 74 | 543 | 115 | Fluoride-Based | Nitrogen |
| | 15 | 20.0 | 4.0 | 0 | Balance | 79 | 538 | 105 | Fluoride-Based | Nitrogen |
| | 16 | 32.5 | 0.5 | 0 | Balance | 100 | 546 | 18 | Fluoride-Based | Hydrogen |
| | 17 | 20.0 | 5.0 | 5 | Balance | 100 | 524 | 54 | Fluoride-Based | Argon |
| | 18 | 27.0 | 5.5 | 5 | Balance | 100 | 516 | 15 | Fluoride-Based | Nitrogen |
| | 19 | 27.0 | 11.0 | 5 | Balance | 93 | 515 | 27 | Chloride-Based | Nitrogen |
| | 20 | 12.5 | 11.0 | 5 | Balance | 90 | 540 | 36 | Fluoride-Based | Nitrogen |
| | 21 | 37.5 | 5.5 | 5 | Balance | 95 | 523 | 84 | Chloride-Based | Nitrogen |
| | 22 | 15.0 | 5.0 | 5 | Balance | 80 | 542 | 74 | Mixture-Based | Nitrogen |
| | 23 | 10.0 | 4.9 | 5 | Balance | 61 | 547 | 65 | Chloride-Based | Nitrogen |
| | 24 | 25.0 | 1.0 | 5 | Balance | 85 | 544 | 53 | Fluoride-Based | Nitrogen |
| | 25 | 25.0 | 4.0 | 10 | Balance | 100 | 510 | 121 | Mixture-Based | Nitrogen |
| | 26 | 27.0 | 5.5 | 10 | Balance | 100 | 533 | 124 | Fluoride-Based | Nitrogen |
| | 27 | 27.0 | 11.0 | 10 | Balance | 92 | 522 | 112 | Mixture-Based | Nitrogen |
| | 28 | 40.0 | 5.5 | 10 | Balance | 98 | 541 | 147 | Mixture-Based | Nitrogen |
| | 29 | 12.5 | 11.0 | 10 | Balance | 96 | 544 | 150 | Fluoride-Based | Nitrogen |
| | 30 | 12.5 | 7.0 | 10 | Balance | 100 | 539 | 25 | Fluoride-Based | Nitrogen |
| | 31 | 12.5 | 2.6 | 10 | Balance | 60 | 545 | 10 | Mixture-Based | Nitrogen |
| | 32 | 20.0 | 1.0 | 10 | Balance | 76 | 527 | 36 | Mixture-Based | Nitrogen |
| | 33 | 35.0 | 1.0 | 10 | Balance | 100 | 536 | 39 | Chloride-Based | Nitrogen |
| | 34 | 5.0 | 10.0 | 15 | Balance | 76 | 543 | 42 | Fluoride-Based | Nitrogen |
| | 35 | 2.0 | 5.0 | 20 | Balance | 62 | 546 | 56 | Fluoride-Based | Nitrogen |

TABLE 2

| | | Component Composition of Brazing Material | | | | | | | | |
|---|---|---|---|---|---|---|---|---|---|---|
| | Alloy Number | Cu (mass %) | Si (mass %) | Zn (mass %) | Al + Inevitable Impurities | Liquid Phase Ratio at 548° C. (%) | Brazing Temperature (° C.) | Average Grain Diameter of Powder (μm) | Flux | Brazing Atmosphere |
| Examples | 36 | 0.0 | 15.0 | 20 | Balance | 50 | 546 | 43 | Fluoride-Based | Nitrogen |
| | 37 | 10.0 | 0.0 | 20 | Balance | 44.3 | 546 | 142 | Fluoride-Based | Nitrogen |
| | 38 | 27.5 | 5.7 | 0 | Balance | 100 | 541 | 114 | Chloride-Based | Argon |
| | 39 | 27.5 | 8.0 | 0 | Balance | 98 | 539 | 148 | Fluoride-Based | Nitrogen |
| | 40 | 27.5 | 11.0 | 0 | Balance | 94 | 538 | 132 | Mixture-Based | Nitrogen |
| | 41 | 32.5 | 5.7 | 0 | Balance | 100 | 542 | 127 | Fluoride-Based | Nitrogen |
| | 42 | 40.0 | 5.7 | 0 | Balance | 64 | 546 | 129 | Fluoride-Based | Nitrogen |

TABLE 2-continued

| | Component Composition of Brazing Material | | | | | | | | |
|---|---|---|---|---|---|---|---|---|---|
| Alloy Number | Cu (mass %) | Si (mass %) | Zn (mass %) | Al + Inevitable Impurities | Liquid Phase Ratio at 548° C. (%) | Brazing Temperature (° C.) | Average Grain Diameter of Powder (μm) | Flux | Brazing Atmosphere |
| 43 | 32.5 | 8.0 | 0 | Balance | 97 | 539 | 17 | Chloride-Based | Nitrogen |
| 44 | 37.5 | 10.0 | 0 | Balance | 65 | 547 | 36 | Mixture-Based | Nitrogen |
| 45 | 30.0 | 6.0 | 5 | Balance | 99 | 536 | 39 | Fluoride-Based | Argon |
| 46 | 30.0 | 11.0 | 5 | Balance | 92 | 538 | 84 | Chloride-Based | Nitrogen |
| 47 | 40.0 | 6.0 | 5 | Balance | 76 | 546 | 56 | Mixture-Based | Nitrogen |
| 48 | 30.0 | 6.0 | 10 | Balance | 98 | 542 | 46 | Fluoride-Based | Nitrogen |
| 49 | 30.0 | 11.0 | 10 | Balance | 91 | 543 | 37 | Fluoride-Based | Hydrogen |
| 50 | 40.0 | 6.0 | 10 | Balance | 97 | 523 | 58 | Chloride-Based | Nitrogen |
| 51 | 13.0 | 2.0 | 0 | Balance | 38 | 547 | 42 | Fluoride-Based | Nitrogen |
| 52 | 10.0 | 9.0 | 0 | Balance | 50 | 547 | 150 | Fluoride-Based | Nitrogen |
| 53 | 12.5 | 4.0 | 0 | Balance | 52 | 542 | 46 | Mixture-Based | Nitrogen |
| 54 | 15.0 | 2.0 | 5 | Balance | 54 | 543 | 21 | Chloride-Based | Nitrogen |
| 55 | 10.0 | 3.0 | 5 | Balance | 44 | 547 | 19 | Fluoride-Based | Nitrogen |
| 56 | 10.0 | 2.0 | 10 | Balance | 44 | 544 | 16 | Chloride-Based | Nitrogen |
| 57 | 15.0 | 1.0 | 10 | Balance | 55 | 545 | 17 | Fluoride-Based | Nitrogen |
| 58 | 30.0 | 3.0 | 0 | Balance | 100 | 539 | 5 | Fluoride-Based | Nitrogen |
| 59 | 30.0 | 3.0 | 5 | Balance | 100 | 543 | 8 | Chloride-Based | Nitrogen |
| 60 | 30.0 | 3.0 | 10 | Balance | 100 | 529 | 3 | Fluoride-Based | Nitrogen |
| 61 | 30.0 | 2.0 | 0 | Balance | 100 | 542 | 159 | Chloride-Based | Nitrogen |
| 62 | 30.0 | 2.0 | 5 | Balance | 100 | 536 | 168 | Fluoride-Based | Nitrogen |
| 63 | 30.0 | 2.0 | 10 | Balance | 100 | 543 | 172 | Chloride-Based | Nitrogen |
| 64 | 0.0 | 0.0 | 45 | Balance | 50 | 538 | 57 | Fluoride-Based | Nitrogen |

TABLE 3

| | | Component Composition of Brazing Material | | | | | | | | |
|---|---|---|---|---|---|---|---|---|---|---|
| | Alloy Number | Cu (mass %) | Si (mass %) | Zn (mass %) | Al + Inevitable Impurities | Liquid Phase Ratio at 548° C. (%) | Brazing Temperature (° C.) | Average Grain Diameter of Powder (μm) | Flux | Brazing Atmosphere |
| Comparative Examples | 65 | 25.0 | 5.0 | 0 | Balance | 100 | 595 | 28 | Fluoride-Based | Nitrogen |
| | 66 | 25.0 | 5.0 | 5 | Balance | 100 | 548 | 69 | Chroride-Based | Nitrogen |
| | 67 | 25.0 | 5.0 | 10 | Balance | 100 | 582 | 78 | Mixture-Based | Nitrogen |
| | 68 | 10.0 | 5.0 | 0 | Balance | 49 | 595 | 82 | Fluoride-Based | Nitrogen |
| | 69 | 4.0 | 10.0 | 10 | Balance | 40 | 595 | 93 | Fluoride-Based | Nitrogen |

(2) Preparation of Flux and Preparation of Slurry Containing Flux and Brazing Material:

For fluxes, CF-7, available from DAIICHI KIGENSO KAGAKU KOGYO CO., LTD, was used as a fluoride-based flux; FL-55, available from MORITA CHEMICAL INDUSTRIES CO., LTD, was used as a chloride-based flux; and a mixture of CF-7 and FL-55 was used as a mixture-based flux. CF-7 was composed of Cs (55 mol %)-AlF$_3$ (45 mol %), and the composition was carried out so that the melting point of 410° C. could be obtained. Also, FL-55 contained ZnCl$_2$ of at least 40 mass %, and NaCl—KCl—LiCl—LiF as another component, which were prepared so that the melting point of 450° C. could be obtained. The mixture-based flux was prepared so as to have CF-7 of 50 mass % and FL-55 of 50 mass %. Each of the aforesaid three kinds of fluxes of 100 g and the powder-form brazing material of 80 g were combined with each other, and was then mixed with a commercially-available organic-substance-based binder of 100 g featuring a good volatility and pyrolytic property (more than 99.9% of which could be vaporized) at a temperature of 410° C., resulting in preparation of three kinds of slurries each of which contained the flux and the powder-form brazing material.

(3) Pre-Assembly of Members to be Joined and Brazing Material:

In order to estimate a brazing property, multi-hole aluminum alloy flat tubes (each of which had a thickness of 4 mm, a width of 20 mm and a length of 150 mm, and was featured by seven hollows each having a width of 2 mm, a height of 2 mm and a length of 150 mm) formed of 1050 aluminum alloy and copper alloy flat tubes (each of which had a thickness of 1 mm, a width of 20 mm and a length of 150 mm) were prepared.

One of the multi-hole aluminum alloy flat tubes and one of the copper alloy flat tubes were combined with each other so that a lower face (having the width of 20 mm and the length of 150 mm) of the multi-hole aluminum alloy flat tube was in close contact with an upper face (having the width of 20 mm and the length of 150 mm) of the copper alloy flat tube, and a coat of any one of the aforesaid slurries was intervened in a clearance between the multi-hole aluminum alloy flat tube and the copper alloy flat tube, and was dried at a room temperature, resulting in production of a brazing test sample assembly. Then, each of the brazing test sample assemblies thus produced was placed in an atmosphere oven, and a gas existed in an interior of the atmosphere oven was replaced with any one of an argon gas, a nitrogen gas and a hydrogen gas, as shown in TABLES 1 and 2. Thereafter, the brazing test sample assembly concerned was heated in the atmosphere oven to 510° C. over about 40 min., and then was maintained over a time period of 3 min. at a corresponding brazing temperature falling within the range from 510° C. to 595° C. Then, the brazing test sample assembly concerned was cooled to room temperature, resulting in completion of a brazing process. In the cases where a chloride-based flux was used, each of the brazing test sample assemblies was subjected to a water-washing process after the brazing process to remove the residue of the chloride-based flux from the brazing test sample assembly concerned. Note, liquid phase ratios of the respective aluminum alloys at the temperature of 548° C., which were calculated by using the "Thermo-Calc Software", are shown in TABLES 1, 2 and 3.

Then, with respect to a join property, occurrence or non-occurrence of a eutectic melting, and an erosion resistance, each of the brazing test sample assemblies was estimated as a brazed test piece by using the below-mentioned method methods. The Estimated results are shown in TABLES 4, 5 and 6.

TABLE 4

| | Alloy Numbers | Join Property | Occurrence Or Non-Occurrence of Eutectic Melting | Erosion Resistance | Comprehensive Estimation |
|---|---|---|---|---|---|
| Examples | 1 | ◎ | ○ | ○ | ◎ |
| | 2 | ◎ | ○ | ○ | ◎ |
| | 3 | ◎ | ○ | ○ | ◎ |
| | 4 | ◎ | ○ | ○ | ◎ |
| | 5 | ◎ | ○ | ○ | ◎ |
| | 6 | ◎ | ○ | ○ | ◎ |
| | 7 | ◎ | ○ | ○ | ◎ |
| | 8 | ◎ | ○ | ○ | ◎ |
| | 9 | ○ | ○ | ○ | ○ |
| | 10 | ○ | ○ | ○ | ○ |
| | 11 | ○ | ○ | ○ | ○ |
| | 12 | ○ | ○ | ○ | ○ |
| | 13 | ○ | ○ | ○ | ○ |
| | 14 | ○ | ○ | ○ | ○ |
| | 15 | ○ | ○ | ○ | ○ |
| | 16 | ○ | ○ | ○ | ○ |
| | 17 | ◎ | ○ | ○ | ◎ |
| | 18 | ◎ | ○ | ○ | ◎ |
| | 19 | ◎ | ○ | ○ | ◎ |
| | 20 | ◎ | ○ | ○ | ◎ |
| | 21 | ◎ | ○ | ○ | ◎ |
| | 22 | ◎ | ○ | ○ | ◎ |
| | 23 | ○ | ○ | ○ | ○ |
| | 24 | ◎ | ○ | ○ | ◎ |
| | 25 | ◎ | ○ | ○ | ◎ |
| | 26 | ◎ | ○ | ○ | ◎ |
| | 27 | ◎ | ○ | ○ | ◎ |
| | 28 | ◎ | ○ | ○ | ◎ |
| | 29 | ◎ | ○ | ○ | ◎ |
| | 30 | ◎ | ○ | ○ | ◎ |
| | 31 | ○ | ○ | ○ | ○ |
| | 32 | ○ | ○ | ○ | ○ |
| | 33 | ◎ | ○ | ○ | ◎ |
| | 34 | ○ | ○ | ○ | ○ |
| | 35 | ○ | ○ | ○ | ○ |

TABLE 5

| | Alloy Numbers | Join Property | Occurrence Or Non-Occurrence of Eutectic Melting | Erosion Resistance | Comprehensive Estimation |
|---|---|---|---|---|---|
| Examples | 36 | △ | ○ | ○ | △ |
| | 37 | △ | ○ | ○ | △ |
| | 38 | ◎ | ○ | △ | △ |
| | 39 | ◎ | ○ | △ | △ |
| | 40 | ◎ | ○ | △ | △ |
| | 41 | ◎ | ○ | △ | △ |
| | 42 | ○ | ○ | △ | △ |
| | 43 | ◎ | ○ | △ | △ |
| | 44 | ○ | ○ | △ | △ |
| | 45 | ◎ | ○ | △ | △ |
| | 46 | ◎ | ○ | △ | △ |
| | 47 | ○ | ○ | △ | △ |
| | 48 | ◎ | ○ | △ | △ |
| | 49 | ◎ | ○ | △ | △ |
| | 50 | ◎ | ○ | △ | △ |
| | 51 | △ | ○ | ○ | △ |
| | 52 | △ | ○ | ○ | △ |
| | 53 | △ | ○ | ○ | △ |
| | 54 | △ | ○ | ○ | △ |
| | 55 | △ | ○ | ○ | △ |
| | 56 | △ | ○ | ○ | △ |
| | 57 | △ | ○ | ○ | △ |
| | 58 | ○△ | ○ | ○ | ○△ |
| | 59 | ○△ | ○ | ○ | ○△ |
| | 60 | ○△ | ○ | ○ | ○△ |
| | 61 | ○△ | ○ | ○ | ○△ |
| | 62 | ○△ | ○ | ○ | ○△ |
| | 63 | ○△ | ○ | ○ | ○△ |
| | 64 | △ | ○ | △ | △ |

TABLE 6

| | Alloy Numbers | Join Property | Occurrence Or Non-Occurrence of Eutectic Melting | Erosion Resistance | Comprehensive Estimation |
|---|---|---|---|---|---|
| Comparative Examples | 65 | — | X | X | X |
| | 66 | — | X | X | X |
| | 67 | — | X | X | X |
| | 68 | — | X | X | X |
| | 69 | — | X | X | X |

(4) Estimation of Join Property:

Each of the brazed test pieces was longitudinally and vertically cut off, and a light-microscopy cross-sectional observation was carried out with respect to the cut section, to thereby estimate a join property of the brazed test piece concerned, as a substitute for a property representing a heat exchange ratio of a heat exchanger. In a brazed test piece, when a ratio of an un-joined length to a full length of the join junction was less than 5%, it was designated by symbol "◎". In a brazed test piece, when a ratio of an un-joined length to a full length of the join junction was at least 5% but less than 10%, it was designated by symbol "○". In a brazed test piece, when a ratio of an un-joined length to a full length of the join junction was at least 10% but less than 20%, it was designated by symbol "◎○". In a brazed test piece, when a ratio of an un-joined length to a full length of the join junction was at least 20% but less than 60%, it was designated by symbol "△". In a brazed test piece, when a ratio of an un-joined length to a full length of the join junction was at least 60% or when the join junction could not be obtained, it was designated by symbol "x". Note, in a brazed test piece, when an estimation could not be carried out due to a remarkable deformation caused by a eutectic melting, it was designated by symbol "—". The brazed test pieces, designated by any one of the symbols "◎", "○", "◎○" and "△", were judged to be acceptable, and the brazed test pieces, which were designated by the symbol "x" were judged to be unacceptable.

(5) Occurrence or Non-Occurrence of Eutectic Melting:

Each of the brazed test pieces was visually observed to determine whether a eutectic melting occurred. In a brazed test piece, when no eutectic melting occurred, it was designated by symbol "⊚". In a brazed test piece, when a eutectic melting occurred even at a part of the join junction, it was designated by symbol "x". The brazed test pieces, designated by symbol "⊚", were judged to be acceptable, and brazed test pieces, which designated by the symbol "x", were judged to be unacceptable.

(6) Estimation of Erosion Resistance:

Each of the brazed test pieces was longitudinally and vertically cut off, and a light-microscopy cross-sectional observation was carried out with respect to the cut section. Then, an erosion ratio on the brazing material, which was defined by a division, i.e., (the maximum depth eroded by the brazing material from the boundary between the brazing material and the member(s) to be joined, which was defined before the brazing process)/(the thickness of the member(s) to be joined), was calculated, to thereby estimate an erosion resistance. In a brazed test piece, when the erosion ratio on the brazing material was less than 5%, it was designated by symbol "○". In a brazed test piece, when the erosion ratio on the brazing material was at least 5% but less than 20%, it was designated by symbol "Δ". In a brazed test piece, when the erosion was remarkable, and when the erosion ratio on the brazing material exceeded 20%, it was designated by symbol "x". The brazed test pieces, which were designated by either the symbol "○" or "Δ", were judged to be acceptable, and the brazed test pieces, which were designated by the symbol "x", were judged to be unacceptable.

(7) Comprehensive Judgment:

Based on the aforesaid test results, a comprehensive judgment was performed on each of the brazed test pieces. In particular, when a brazed text piece was designated by the symbol "⊚" in each of the aforesaid tests, 7 points were given to it; when a brazed test piece was designated by the symbol "○" in each of the aforesaid tests, 5 points were given to it; when a brazed test piece was designated by the symbol "○Δ" in each of the aforesaid tests, 3 points were given to it; when a brazed test piece was designated by the symbol "Δ" in each of the aforesaid tests, a zero point was given to it; and when a brazed test piece was designated by either the symbol "x" or "—" in each of the aforesaid tests, −5 points were given to it. For the comprehensive judgment, when a brazed test piece gained 17 points in total, it was designated by a symbol "⊚"; when a brazed test piece gained at least 15 points and less than 17 points in total, it was designated by a symbol "○Δ"; when a brazed test piece gained at least the zero point and less than 13 points in total, it was designated by a symbol "Δ"; when a brazed test piece gained less than the zero point in total, it was designated by a symbol "x". In the comprehensive judgment, the brazed test pieces, which were designated by any one of the symbols "⊚", "○" "○Δ" and "Δ", were judged to be acceptable, and the brazed test pieces, which were designated by the symbol "x", were judged to be unacceptable.

As shown in TABLES 4 and 5, in the comprehensive judgment, Examples 1 to 64 were acceptable.

On the other hand, as shown in TABLE 6, in the comprehensive judgment, Comparative Examples 65 to 69 were unacceptable because of the occurrence of the eutectic melting due to the fact that the brazing temperature was too high.

Examples 70 to 117 and Comparative Examples 118 to 122

(1) Preparation of Foil-Form Brazing Material:

Plural kinds of brazing materials in a foil form were used. In order to obtain the plural kinds of foil-form brazing materials, plural kinds of molten metals for aluminum alloys, which were composed of respective compositions shown in TABLES 7, 8 and 9, the balances of Al, and inevitable impurities, were prepared, and an ingot was produced from each of the plural kinds of molten metals by using a DC casting method. Then, each of the ingots thus produced was processed into a foil-forma brazing material by using ordinary methods. Thicknesses of the foil-form brazing materials thus processed are shown in TABLES 1, 2 and 3.

TABLE 7

| | | Component Composition of Brazing Material | | | | | | | |
|---|---|---|---|---|---|---|---|---|---|
| | Alloy Numbers | Cu (mass %) | Si (mass %) | Zn (mass %) | Al + Inevitable Impurities | Liquid Phase Ratio at 548° C. (%) | Brazing Temperature (° C.) | Thickness of Foil (mm) | Flux | Brazing Atmosphere |
| Examples | 70 | 25.0 | 5.0 | 0 | Balance | 100 | 547 | 0.15 | Fluoride-Based | Nitrogen |
| | 71 | 17.5 | 7.0 | 0 | Balance | 95 | 540 | 0.11 | Chloride-Based | Nitrogen |
| | 72 | 27.0 | 5.5 | 0 | Balance | 100 | 542 | 0.19 | Chloride-Based | Nitrogen |
| | 73 | 27.0 | 8.0 | 0 | Balance | 98 | 538 | 0.10 | Mixture-Based | Nitrogen |
| | 74 | 27.0 | 11.0 | 0 | Balance | 94 | 526 | 0.16 | Fluoride-Based | Argon |
| | 75 | 15.0 | 11.0 | 0 | Balance | 85 | 534 | 0.20 | Chloride-Based | Hydrogen |
| | 76 | 32.5 | 5.5 | 0 | Balance | 99 | 531 | 0.14 | Chloride-Based | Nitrogen |
| | 77 | 12.5 | 4.9 | 0 | Balance | 60 | 547 | 0.16 | Mixture-Based | Nitrogen |
| | 78 | 20.0 | 2.0 | 0 | Balance | 63 | 546 | 0.13 | Fluoride-Based | Nitrogen |
| | 79 | 32.5 | 0.5 | 0 | Balance | 100 | 546 | 0.12 | Fluoride-Based | Hydrogen |
| | 80 | 27.0 | 5.5 | 5 | Balance | 100 | 516 | 0.11 | Fluoride-Based | Nitrogen |
| | 81 | 27.0 | 11.0 | 5 | Balance | 93 | 515 | 0.16 | Chloride-Based | Nitrogen |
| | 82 | 12.5 | 11.0 | 5 | Balance | 90 | 540 | 0.17 | Fluoride-Based | Nitrogen |
| | 83 | 37.5 | 5.5 | 5 | Balance | 95 | 523 | 0.19 | Chloride-Based | Nitrogen |
| | 84 | 10.0 | 4.9 | 5 | Balance | 61 | 547 | 0.18 | Chloride-Based | Nitrogen |
| | 85 | 25.0 | 1.0 | 5 | Balance | 85 | 544 | 0.14 | Fluoride-Based | Nitrogen |
| | 86 | 27.0 | 5.5 | 10 | Balance | 100 | 510 | 0.11 | Fluoride-Based | Nitrogen |
| | 87 | 27.0 | 11.0 | 10 | Balance | 92 | 522 | 0.13 | Mixture-Based | Nitrogen |

TABLE 7-continued

| | | Component Composition of Brazing Material | | | | | | | |
|---|---|---|---|---|---|---|---|---|---|
| Alloy Numbers | Cu (mass %) | Si (mass %) | Zn (mass %) | Al + Inevitable Impurities | Liquid Phase Ratio at 548° C. (%) | Brazing Temperature (° C.) | Thickness of Foil (mm) | Flux | Brazing Atmosphere |
| 88 | 40.0 | 5.5 | 10 | Balance | 98 | 541 | 0.16 | Mixture-Based | Nitrogen |
| 89 | 12.5 | 11.0 | 10 | Balance | 96 | 544 | 0.17 | Fluoride-Based | Nitrogen |
| 90 | 12.5 | 2.6 | 10 | Balance | 60 | 545 | 0.11 | Mixture-Based | Nitrogen |
| 91 | 20.0 | 1.0 | 10 | Balance | 76 | 527 | 0.13 | Mixture-Based | Nitrogen |
| 92 | 35.0 | 1.0 | 10 | Balance | 100 | 536 | 0.12 | Chloride-Based | Nitrogen |
| 93 | 5.0 | 10.0 | 15 | Balance | 76 | 543 | 0.19 | Fluoride-Based | Nitrogen |
| 94 | 2.0 | 5.0 | 20 | Balance | 62 | 546 | 0.18 | Fluoride-Based | Nitrogen |

TABLE 8

| | | | Component Composition of Brazing Material | | | | | | | |
|---|---|---|---|---|---|---|---|---|---|---|
| | Alloy Numbers | Cu (mass %) | Si (mass %) | Zn (mass %) | Al + Inevitable Impurities | Liquid Phase Ratio at 548° C. (%) | Brazing Temperature (° C.) | Thickness of Foil (mm) | Flux | Brazing Atmosphere |
| Examples | 95 | 0.0 | 15.0 | 20 | Balance | 50 | 546 | 0.11 | Fluoride-Based | Nitrogen |
| | 96 | 10.0 | 0.0 | 20 | Balance | 44.3 | 546 | 0.12 | Fluoride-Based | Nitrogen |
| | 97 | 27.5 | 5.7 | 0 | Balance | 100 | 541 | 0.14 | Chloride-Based | Argon |
| | 98 | 27.5 | 11.0 | 0 | Balance | 94 | 538 | 0.14 | Mixture-Based | Nitrogen |
| | 99 | 40.0 | 5.7 | 0 | Balance | 64 | 546 | 0.11 | Fluoride-Based | Nitrogen |
| | 100 | 37.5 | 10.0 | 0 | Balance | 65 | 547 | 0.12 | Mixture-Based | Nitrogen |
| | 101 | 30.0 | 6.0 | 5 | Balance | 99 | 536 | 0.16 | Fluoride-Based | Argon |
| | 102 | 30.0 | 11.0 | 5 | Balance | 92 | 538 | 0.17 | Chloride-Based | Nitrogen |
| | 103 | 40.0 | 6.0 | 5 | Balance | 76 | 546 | 0.16 | Mixture-Based | Nitrogen |
| | 104 | 30.0 | 6.0 | 10 | Balance | 98 | 542 | 0.13 | Fluoride-Based | Nitrogen |
| | 105 | 30.0 | 11.0 | 10 | Balance | 91 | 543 | 0.12 | Fluoride-Based | Hydrogen |
| | 106 | 40.0 | 6.0 | 10 | Balance | 97 | 523 | 0.13 | Chloride-Based | Nitrogen |
| | 107 | 13.0 | 2.0 | 0 | Balance | 38 | 547 | 0.17 | Fluoride-Based | Nitrogen |
| | 108 | 10.0 | 9.0 | 0 | Balance | 50 | 547 | 0.16 | Fluoride-Based | Nitrogen |
| | 109 | 12.5 | 4.0 | 0 | Balance | 52 | 542 | 0.19 | Mixture-Based | Nitrogen |
| | 110 | 15.0 | 2.0 | 5 | Balance | 54 | 543 | 0.18 | Chloride-Based | Nitrogen |
| | 111 | 10.0 | 3.0 | 5 | Balance | 44 | 547 | 0.20 | Fluoride-Based | Nitrogen |
| | 112 | 10.0 | 2.0 | 10 | Balance | 44 | 544 | 0.18 | Chloride-Based | Nitrogen |
| | 113 | 15.0 | 1.0 | 10 | Balance | 55 | 545 | 0.14 | Fluoride-Based | Nitrogen |
| | 114 | 30.0 | 2.0 | 0 | Balance | 100 | 542 | 0.36 | Chloride-Based | Nitrogen |
| | 115 | 30.0 | 2.0 | 5 | Balance | 100 | 536 | 0.22 | Fluoride-Based | Nitrogen |
| | 116 | 30.0 | 2.0 | 10 | Balance | 100 | 543 | 0.30 | Chloride-Based | Nitrogen |
| | 117 | 0.0 | 0.0 | 45 | Balance | 50 | 538 | 0.15 | Fluoride-Based | Nitrogen |

TABLE 9

| | | | Component Composition of Brazing Material | | | | | | | |
|---|---|---|---|---|---|---|---|---|---|---|
| | Alloy Numbers | Cu (mass %) | Si (mass %) | Zn (mass %) | Al + Inevitable Impurities | Liquid Phase Ratio at 548° C. (%) | Brazing Temperature (° C.) | Thickness of Foil (mm) | Flux | Brazing Atmosphere |
| Comparative Examples | 118 | 25.0 | 5.0 | 0 | Balance | 100 | 595 | 0.16 | Fluoride-Based | Nitrogen |
| | 119 | 25.0 | 5.0 | 5 | Balance | 100 | 548 | 0.17 | Chroride-Based | Nitrogen |
| | 120 | 25.0 | 5.0 | 10 | Balance | 100 | 582 | 0.19 | Mixture-Based | Nitrogen |
| | 121 | 10.0 | 5.0 | 0 | Balance | 49 | 595 | 0.18 | Fluoride-Based | Nitrogen |
| | 122 | 4.0 | 10.0 | 10 | Balance | 40 | 595 | 0.14 | Fluoride-Based | Nitrogen |

(2) Preparation of Flux and Preparation of Slurry Containing Flux:

For fluxes, CF-7, available from DAIICHI KIGENSO KAGAKU KOGYO CO., LTD, was used as a fluoride-based flux; FL-55, available from MORITA CHEMICAL INDUSTRIES CO., LTD, was used as a chloride-based flux; and a mixture of CF-7 and FL-55 was used as a mixture-based flux. CF-7 was composed of Cs (55 mol %)-AlF$_3$ (45 mol %), and the composition was carried out so that the melting point of 410° C. could be obtained. Also, FL-55 contained ZnCl$_2$ of at least 40 mass %, and NaCl—KCl—LiCl—LiF as another component, which were prepared so that the melting point of 450° C. could be obtained. The mixture-based flux was prepared so as to have CF-7 of 50 mass % and FL-55 of 50 mass %. Each of the aforesaid three kinds of fluxes of 100 g was mixed with a commercially-available organic-substance-based binder of 100 g featuring a good volatility and pyrolytic property (more than 99.9% of which could be vaporized) at a temperature of 410° C., resulting in preparation of three kinds of slurries.

(3) Pre-Assembly of Members to be Joined and Brazing Material:

In order to estimate a brazing property, multi-hole aluminum alloy flat tubes (each of which had a thickness of 4 mm, a width of 20 mm and a length of 150 mm, and was featured by seven hollows each having a width of 2 mm a height of 2 mm and a length of 150 mm) formed of 1050 aluminum alloy, copper alloy flat tubes (each of which had a thickness of 1 mm, a width of 20 mm and a length of 150 mm), and foil-form brazing materials (each of which had a thickness of 0.1 mm, a width of 20 mm and length of 150 mm) were prepared.

One of the foil-form brazing material was immersed in any one of the aforesaid three kinds of slurries containing the respective fluxes, and was sandwiched between a lower face (having the width of 20 mm and the length of 150 mm) of the multi-hole aluminum alloy flat tube and an upper face (having the width of 20 mm and the length of 150 mm) of the copper alloy flat tube, resulting in production of a brazing test sample assembly. Then, each of the brazing test sample assemblies thus produced was placed in an atmosphere oven, and a gas existed in an interior of the atmosphere oven was replaced with any one of an argon gas, a nitrogen gas and a hydrogen gas, as shown in TABLES 7, 8 and 9. Thereafter, the brazing test sample assembly concerned was heated in the atmosphere oven to 510° C. over a time period of about 40 min., and then was maintained over a time period of 3 min. at a corresponding brazing temperature falling within the range from 510° C. to 595° C. Then, the brazing test sample assembly concerned was cooled to room temperature, resulting in completion of a brazing process. In the cases where a chloride-based flux was used, each of the brazing test sample assemblies was subjected to a water-washing process after the brazing process to thereby remove the residue of the chloride-based flux from the brazing test sample assembly concerned. Note, liquid phase ratios of the respective aluminum alloys at the temperature of 548° C., which were calculated by using the "Thermo-Calc Software", are shown in TABLES 7, 8 and 9.

Then, with respect to a join property, occurrence or non-occurrence of a eutectic melting, and an erosion resistance, each of the brazing test sample assemblies was estimated as a brazed test piece in a similar manner to the cases Examples 1 to 64 and Comparative Examples 65 to 69 as mentioned above. The Estimated results are shown in TABLES 10, 11 and 12.

TABLE 10

|  | Alloy Numbers | Join Property | Occurrence Or Non-Occurrence of Eutectic Melting | Erosion Resistance | Comprehensive Estimation |
|---|---|---|---|---|---|
| Examples | 70 | ◎ | ○ | ○ | ◎ |
|  | 71 | ◎ | ○ | ○ | ◎ |
|  | 72 | ◎ | ○ | ○ | ◎ |
|  | 73 | ◎ | ○ | ○ | ◎ |
|  | 74 | ◎ | ○ | ○ | ◎ |
|  | 75 | ◎ | ○ | ○ | ◎ |
|  | 76 | ◎ | ○ | ○ | ◎ |
|  | 77 | ○ | ○ | ○ | ○ |
|  | 78 | ○ | ○ | ○ | ○ |
|  | 79 | ○ | ○ | ○ | ○ |
|  | 80 | ◎ | ○ | ○ | ◎ |
|  | 81 | ◎ | ○ | ○ | ◎ |
|  | 82 | ◎ | ○ | ○ | ◎ |
|  | 83 | ◎ | ○ | ○ | ◎ |
|  | 84 | ○ | ○ | ○ | ○ |
|  | 85 | ◎ | ○ | ○ | ◎ |
|  | 86 | ◎ | ○ | ○ | ◎ |
|  | 87 | ◎ | ○ | ○ | ◎ |
|  | 88 | ◎ | ○ | ○ | ◎ |
|  | 89 | ◎ | ○ | ○ | ◎ |
|  | 90 | ○ | ○ | ○ | ○ |

TABLE 10-continued

| Alloy Numbers | Join Property | Occurrence Or Non-Occurrence of Eutectic Melting | Erosion Resistance | Comprehensive Estimation |
|---|---|---|---|---|
| 91 | ○ | ○ | ○ | ○ |
| 92 | ◎ | ○ | ○ | ◎ |
| 93 | ○ | ○ | ○ | ○ |
| 94 | ○ | ○ | ○ | ○ |

TABLE 11

|  | Alloy Numbers | Join Property | Occurrence Or Non-Occurrence of Eutectic Melting | Erosion Resistance | Comprehensive Estimation |
|---|---|---|---|---|---|
| Examples | 95 | △ | ○ | ○ | △ |
|  | 96 | △ | ○ | ○ | △ |
|  | 97 | ◎ | ○ | △ | △ |
|  | 98 | ◎ | ○ | △ | △ |
|  | 99 | ○ | ○ | △ | △ |
|  | 100 | ○ | ○ | △ | △ |
|  | 101 | ◎ | ○ | △ | △ |
|  | 102 | ◎ | ○ | △ | △ |
|  | 103 | ○ | ○ | △ | △ |
|  | 104 | ◎ | ○ | △ | △ |
|  | 105 | ◎ | ○ | △ | △ |
|  | 106 | ◎ | ○ | △ | △ |
|  | 107 | △ | ○ | ○ | △ |
|  | 108 | △ | ○ | ○ | △ |
|  | 109 | △ | ○ | ○ | △ |
|  | 110 | △ | ○ | ○ | △ |
|  | 111 | △ | ○ | ○ | △ |
|  | 112 | △ | ○ | ○ | △ |
|  | 113 | △ | ○ | ○ | △ |
|  | 114 | ○△ | ○ | ○ | ○△ |
|  | 115 | ○△ | ○ | ○ | ○△ |
|  | 116 | ○△ | ○ | ○ | ○△ |
|  | 117 | △ | ○ | △ | △ |

TABLE 12

|  | Alloy Numbers | Join Property | Occurrence Or Non-Occurrence of Eutectic Melting | Erosion Resistance | Comprehensive Estimation |
|---|---|---|---|---|---|
| Comparative Examples | 118 | — | X | X | X |
|  | 119 | — | X | X | X |
|  | 120 | — | X | X | X |
|  | 121 | — | X | X | X |
|  | 122 | — | X | X | X |

As shown in TABLES 10 and 11, in the comprehensive judgment, Examples 70 to 117 were acceptable.

On the other hand, as shown in TABLE 12, in the comprehensive judgment, Comparative Examples 118 to 122 were unacceptable because of the occurrence of the eutectic melting due to the fact that the brazing temperature was too high.

INDUSTRIAL APPLICABILITY

In a heat exchanger manufacturing method according to the present invention, and a heat exchanger manufactured by the method, since an aluminum alloy tube having cooling-medium flowing passages and a copper alloy tube having water flowing passages can be well brazed to each other without any brazing defects, it is possible to provide a heat exchanger featuring a superior heat exchanging efficiency.

EXPLANATION OF REFERENCE NUMERALS
IN DRAWINGS

1 . . . Erosion-Occurring Region
2 . . . Aluminum Alloy Cooling-Medium Tube
3 . . . Copper Alloy Water Tube
4 . . . Brazing Material
5 . . . Aluminum Alloy Plate
6 . . . Copper Alloy Tube
7 . . . Brazing Material

The invention claimed is:

1. A method of manufacturing a heat exchanger having an aluminum alloy tube defining a cooling-medium flowing passage and a copper alloy tube defining a water flowing passage, the method comprising:
    brazing said aluminum alloy tube and said copper alloy tube to each other at a temperature of less than 548° C. in an oven having a non-oxidation atmosphere of an inert gas or a reducing gas,
    wherein, in the heat exchanger, a heat exchange is carried out between a cooling medium flowing through the cooling-medium flowing passage and water flowing through the water flowing passage.

2. The manufacturing method as set forth in claim 1, wherein the brazing is carried out by using a brazing material which is composed of Al—Cu—Si based alloy or an Al—Cu—Si—Zn based alloy.

3. The manufacturing method as set forth in claim 2, wherein said Al—Cu—Si based alloy or said Al—Cu—Si—Zn based alloy contains at least one of Cu in an amount of up to 27 mass % and Si in an amount of up to 5.5 mass %.

4. The manufacturing method as set forth in claim 3, wherein a ratio of liquid phase mass created in the brazing material produced from said Al—Cu—Si based alloy or said Al—Cu—Si—Zn based alloy to a total mass of the brazing material is at least 60% at the temperature of 548° C.

5. The manufacturing method as set forth in claim 2, wherein said Al—Cu—Si based alloy or said Al—Cu—Si—Zn based alloy contains Cu in an amount of up to 27 mass %.

6. The manufacturing method as set forth in claim 2, wherein said Al—Cu—Si based alloy or said Al—Cu—Si—Zn based alloy contains Si in an amount of up to 5.5 mass %.

7. The manufacturing method as set forth in claim 2, wherein said Al—Cu—Si based alloy or said Al—Cu—Si—Zn based alloy contains Cu in an amount of up to 27 mass % and Si in an amount of up to 5.5 mass %.

8. The manufacturing method as set forth in claim 2, wherein said brazing material is composed of said Al—Cu—Si—Zn based alloy, and
    wherein said Al—Cu—Si—Zn based alloy contains Zn in an amount of up to 20 mass %.

9. The manufacturing method as set forth in claim 1, wherein the inert gas is nitrogen gas or argon gas, and wherein the reducing gas is hydrogen gas.

10. The manufacturing method as set forth in claim 1, wherein the brazing of said aluminum alloy tube and said copper alloy tube to each other is performed at a temperature of greater than or equal to 510° C. and less than 548° C.

* * * * *